US005560175A

United States Patent [19]
Soyka, Jr. et al.

[11] Patent Number: 5,560,175
[45] Date of Patent: Oct. 1, 1996

[54] VEHICLE BODY MOLDING WITH FOLDING FLANGE

[75] Inventors: Richard J. Soyka, Jr., St. Clair Shores; Joseph Palazzolo, Northville, both of Mich.

[73] Assignee: Chrysler Corporation, Highland Park, Mich.

[21] Appl. No.: 527,614

[22] Filed: Sep. 13, 1995

[51] Int. Cl.⁶ .................................................. E04C 2/38
[52] U.S. Cl. .......................... 52/716.5; 52/717.05; 428/31
[58] Field of Search .................... 52/716.5, 716.6, 52/717.05; 428/31, 99, 133

[56] References Cited

U.S. PATENT DOCUMENTS

| | | | |
|---|---|---|---|
| 3,898,315 | 8/1975 | Haag | 264/312 |
| 4,308,704 | 1/1982 | Lloyd | 52/716 |
| 4,401,701 | 8/1983 | Wolters | 52/717.05 X |
| 4,491,614 | 1/1985 | Wolters | 428/31 |
| 4,854,849 | 8/1989 | Sudo | 425/556 |
| 4,869,937 | 9/1989 | Nagata et al. | 428/31 |
| 4,903,449 | 2/1990 | Ellingson, Jr. | 52/288 |
| 5,014,486 | 5/1991 | Mayle | 52/717.1 |
| 5,086,603 | 2/1992 | Graf et al. | 52/716.6 |
| 5,108,801 | 4/1992 | Takahashi | 428/31 |
| 5,362,349 | 11/1994 | Zoller | 156/242 |
| 5,368,903 | 11/1994 | Trier | 428/31 |
| 5,409,746 | 4/1995 | Mimura | 428/31 |

Primary Examiner—Carl D. Friedman
Assistant Examiner—Yvonne Horton-Richardson
Attorney, Agent, or Firm—Margaret A. Dobrowitsky

[57] ABSTRACT

A molding trim for a vehicle includes a hinged flange that is molded in an open position, such that mold lifters are not required to remove the molding from the mold. The hinged flange is connected to a hollow molding body by a living hinge that is integrally formed with the molding body and hinged flange, to permit the hinged flange to be pivoted to a closed position, wherein the hinged flange is positioned against a fixed flange on the molding body. More specifically, the hinged flange is formed with an engagement lip that is advanced against the fixed flange, and continued advancement of the lip causes the lip to ride against and past the fixed flange, such that the fixed flange holds the hinged flange in the closed position. Respective strips of double-backed adhesive tape are affixed to the flanges to hold the molding onto a vehicle body when the hinged flange is in the closed position. To prevent the hinged flange from being advanced excessively far into the molding body, a rib is longitudinally formed on the hinged flange, and the rib abuts the inside surface of the molding body when the hinged flange is in the closed position.

11 Claims, 1 Drawing Sheet

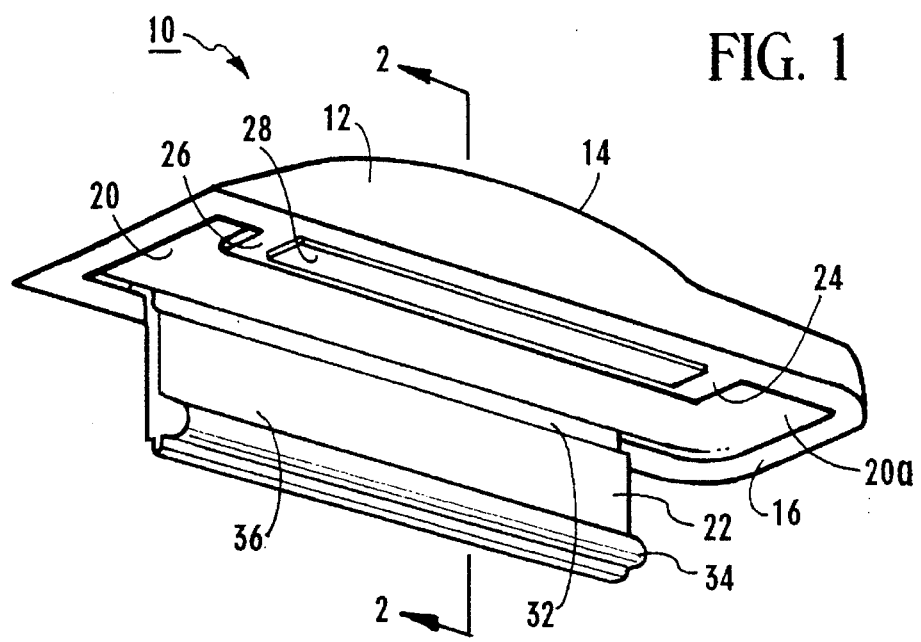
FIG. 1
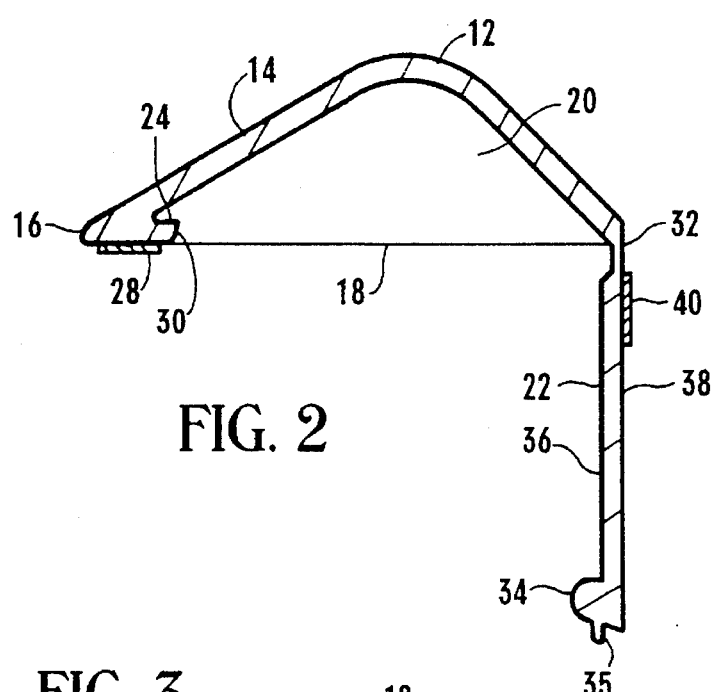
FIG. 2
FIG. 3
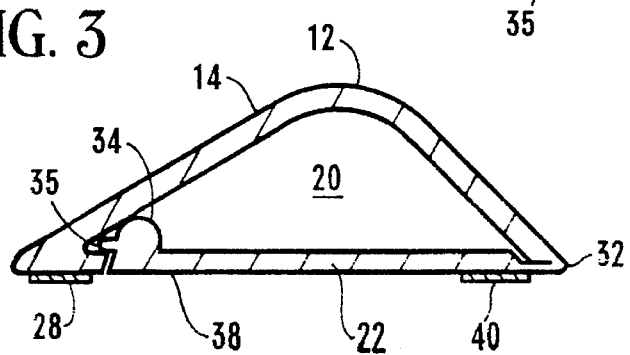

VEHICLE BODY MOLDING WITH FOLDING FLANGE

FIELD OF THE INVENTION

The present invention relates generally to decorative trim moldings, and more particularly to decorative trim moldings which are adhesively held on a vehicle.

BACKGROUND OF THE INVENTION

Many, if not most, passenger vehicles sport decorative outside trim. Typically, the trim of a passenger vehicle is configured as an elongated strip and is adhesively applied to the vehicle body.

Most vehicle trims include a decorative outer surface that faces away from the vehicle and that may be raised from the body of the vehicle. One or more contact flanges are opposed to the outer surface and extend side-by-side the length of the trim, and tape having adhesive deposited on both sides is applied to each contact flange. Then, the tape with trim is applied to the vehicle to hold the trim on the vehicle.

To hide the contact flanges from view when the trim is installed, the contact flanges are positioned beneath the outer surface of the trim. It can readily be appreciated that for trims in which the outer surface is to be raised relatively highly from the vehicle, to reduce cost and weight the trim is not solid, but rather a hollow cavity is established between the flanges and the outer surface during manufacture. For such trims, the contact flanges are spaced from each other to permit access to the cavity, which is required when injection-molding the trim.

Such molding is complicated, however, when the trim is to be configured with an outer surface, one or more contact flanges, and a cavity therebetween, particularly when the width of the trim is such that very little space exists between the contact flanges. More specifically, the mold must have a somewhat complex system of lifters and slides to form the contact flanges while establishing clearance between the contact flanges and interfering mold structure during removal of the trim from the mold.

Accordingly, it is an object of the present invention to provide a decorative vehicle trim which has an outer surface that is raised from contact flanges. Another object of the present invention is to provide a decorative vehicle trim which has an outer surface that is raised from contact flanges, and which can be made by injection molding. Yet another object of the present invention is to provide a decorative vehicle trim which is easy to use and cost-effective to manufacture.

SUMMARY OF THE INVENTION

A trim for decorating a vehicle body includes a trim body defining an outer decorative surface, and the trim body also defines a periphery. First and second flanges are connected to the trim body, and the flanges define respective first and second adhesive surfaces. At least the second flange is hingedly connected to the trim body and is movable between an open position, wherein the second flange extends outwardly from the periphery for facilitating removal of the trim from a mold, and a closed position, wherein the second flange extends inwardly from the periphery and the second adhesive surface is oriented away from the outer surface for abutting the vehicle body to hold the trim against the vehicle.

In the preferred embodiment, a living hinge is formed integrally with the second flange and trim body to hingedly interconnect the second flange and trim body. Also, the second flange is formed with an engagement lip, and the engagement lip rides against and past an edge of the first flange when the second flange is moved from the open position to the closed position. Moreover, the engagement lip abuts the edge of the first flange in the closed position to inhibit moving the second flange to the open position.

In accordance with the preferred embodiment, the edge of the first flange slopes toward the outer surface of the trim body. Consequently the lip of the second flange can ride past the edge of the first flange when the second flange is moved to the closed position. Advantageously, a rib is formed longitudinally on the second flange for abutting the trim body when the second flange is in the closed position, to thereby orient the first and second adhesive surfaces to be substantially co-planar with each other. A first strip of adhesive tape is disposed on the first adhesive surface and a second strip of adhesive tape is disposed on the second adhesive surface.

In another aspect of the present invention, a molding trim for a vehicle body includes a hollow body defining an outer surface and a bottom plane opposed to the outer surface. The molding trim also includes an adhesion surface that is movably connected to the body between a mold position, wherein the adhesion surface extends outwardly away from the bottom plane, and an adhesion position, wherein the adhesion surface is coplanar with the bottom plane for adhering to the vehicle body.

The details of the present invention, both as to its structure and operation, can best be understood in reference to the accompanying drawings, in which like reference numerals refer to like pads, and in which:

BRIEF DESCRIPTION OF THE DRAWINGS

FIG. 1 is a perspective view of the vehicle trim of the present invention, with the hinged flange in the open position;

FIG. 2 is a cross-sectional view as seen along the line 2—2 in FIG. 1; and

FIG. 3 is a cross-sectional view as would be seen along the line 2—2 in FIG. 1 with the hinged flange in the closed position.

DETAILED DESCRIPTION OF THE PREFERRED EMBODIMENT

Referring initially to FIGS. 1 and 2, a decorative trim for a vehicle is shown, generally designated 10. As shown, the trim 10 includes a hollow trim body 12 that defines a contoured decorative outer surface 14, a periphery 16, and a bottom plane 18. Furthermore, the hollow body 12 establishes a cavity 20 having an attenuated front portion 20a. As intended by the present invention, the trim 10 is plastic, and is made by injection-molding in the open position shown in FIGS. 1 and 2.

FIGS. 1 and 2 show that the trim 10 includes a hinged flange 22 and a fixed flange 24. As more fully disclosed below, the hinged flange 22 is hingedly connected to the trim body 12, while the fixed flange 24 is fixedly connected to the trim body 12. It is to be understood, however, that the fixed flange 24 may be hingedly connected to the trim body 12 in accordance with principles discussed herein.

As shown, the fixed flange 24 defines an adhesion surface 26 that is substantially coplanar with the bottom plane 18. A strip of adhesive tape having an adhesive substance deposited on both sides thereof is positioned on the adhesion surface 26. Further, as best shown in FIG. 2, the fixed flange 24 defines an edge 30 that slopes toward the outer surface 14 of the trim body 12, for purposes to be subsequently disclosed.

A living hinge 32 is formed between the hinged flange 22 and the trim body 12, integrally with the flange 22 and trim 12. In accordance with principles of the present invention, the living hinge 32 is a web of reduced thickness vis-a-vis the thickness of the other components of the trim 10. Accordingly, the living hinge 32 permits hinged movement of the hinged flange 22 relative the trim body 12 between the open position shown in FIGS. 1 and 2 and the closed position shown in FIG. 3.

As shown in FIGS. 1 and 2, an elongated rib 34 is formed on a cavity surface 36 of the hinged flange 22. The rib 34 is generally semi-circular in transverse crosssection, as shown in FIG. 2. Also, the rib 34 defines a lip 35, and the lip 35 is contoured to ride against the edge 30 of the fixed flange 24 when the hinged flange 22 is moved to the closed position.

Opposite the cavity surface 36, the hinged flange 22 establishes an adhesion surface 38, and a strip 40 of adhesive tape having an adhesive substance deposited on both sides thereof is positioned on the adhesion surface 38.

With the above disclosure in mind, it may now be appreciated that the hinged flange 22 can be moved from open position shown in FIGS. 1 and 2, wherein the hinged flange 22 extends outwardly from the periphery 16 of the trim body 12 for facilitating removal of the trim 10 from a mold, to a closed position shown in FIG. 3, wherein the hinged flange extends inwardly from the periphery 16 and the adhesion surface 40 is oriented downwardly, i.e., away from the outer surface 14, for abutting a vehicle body to hold the trim 10 against the vehicle. It may be further appreciated that the lip 35 of the hinged flange 22 rides against and then snaps past the edge 30 of the fixed flange 24 when the hinged flange 22 is moved from the open position to the closed position. Stated differently, the adhesion surface 38 of the hinged flange 22 extends outwardly away from the bottom plane 18 in the open position, and is coplanar with the bottom plane 18 in the closed position for adhering to a vehicle body.

Additionally, the lip 35 abuts the edge 30 of the fixed flange 24 in the closed position to inhibit moving the hinged flange 22 to the open position. In the closed position shown in FIG. 3, the rib 34 abuts the trim body 12 to thereby orient the adhesion surfaces 28, 38 of the flanges 22, 24 to be substantially co-planar with each other. Thus, the rib 34 prevents the hinged flange 22 from being moved past the closed position into the cavity 20.

While the particular VEHICLE BODY MOLDING WITH FOLDING FLANGE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A trim for decorating a vehicle body, comprising:

a trim body defining an outer decorative surface, the trim body also defining a periphery;

first and second flanges connected to the trim body and defining respective first and second adhesive surfaces, at least the second flange being hingedly connected to the trim body and movable between an open position, wherein the second flange extends outwardly from the periphery for facilitating removal of the trim from a mold, and a closed position, wherein the second flange extends inwardly from the periphery and the second adhesive surface is oriented away from the outer surface for abutting the vehicle body to hold the trim against the vehicle.

2. The trim of claim 1, further comprising a living hinge formed integrally with the second flange and trim body to hingedly interconnect the second flange and trim body.

3. The trim of claim 2, wherein the second flange is formed with an engagement lip, and the engagement lip rides against and past an edge of the first flange when the second flange is moved from the open position to the closed position, the engagement lip abutting the edge of the first flange in the closed position to inhibit moving the second flange to the open position.

4. The trim of claim 3, wherein the edge of the first flange slopes toward the outer surface of the trim body, to facilitate the lip of the second flange riding past the edge when the second flange is moved to the closed position.

5. The trim of claim 4, further comprising a rib formed longitudinally on the second flange for abutting the trim body when the second flange is in the closed position, to thereby orient the first and second adhesive surfaces to be substantially coplanar with each other.

6. The trim of claim 5, further comprising a first strip of adhesive tape disposed on the first adhesive surface and a second strip of adhesive tape disposed on the second adhesive surface.

7. A molding trim for adhesion to a vehicle body, comprising:

a hollow body defining an outer surface and a bottom plane opposed to the outer surface; and a hinged flange establishing an adhesion surface, the hinged flange being movably connected to the body between a mold position, wherein the adhesion surface extends away from the bottom plane, and an adhesion position, wherein the adhesion surface is coplanar with the bottom plane for adhering to the vehicle body; and a rib formed longitudinally on the hinged flange for abutting the body when the hinged flange is in the adhesion position, to thereby orient the bottom plane and adhesion surface to be substantially co-planar with each other.

8. The molding trim of claim 7, wherein the trim further comprises a living hinge formed integrally with the hinged flange and trim body to hingedly connect the hinged flange with the trim body.

9. The molding trim of claim 8, further comprising a fixed flange formed integrally with the trim body opposite the living hinge, the fixed flange defining a fixed surface that is coplanar with the bottom plane.

10. The molding trim of claim 9, wherein the hinged flange is formed with an engagement lip, and the engagement lip rides against and past an edge of the fixed flange when the hinged flange is moved from the mold position to the adhesion position, the engagement lip abutting the edge of the fixed flange in the adhesion position to inhibit moving the hinged flange to the mold position.

11. The trim molding of claim 10, further comprising a first strip of adhesive tape disposed on the fixed surface and a second strip of adhesive tape disposed on the adhesion surface.

* * * * *